J. DODDER.
Church.
No. 52,272.
Patented Jan'y 30, 1866.
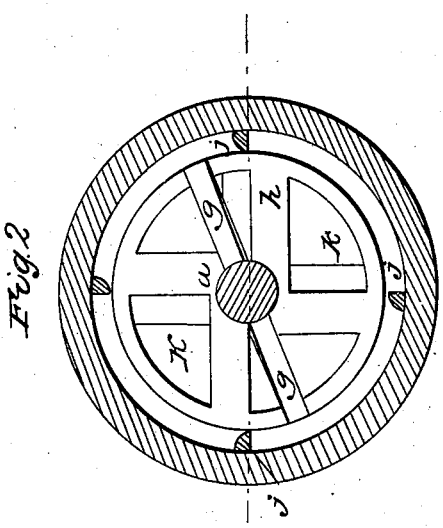
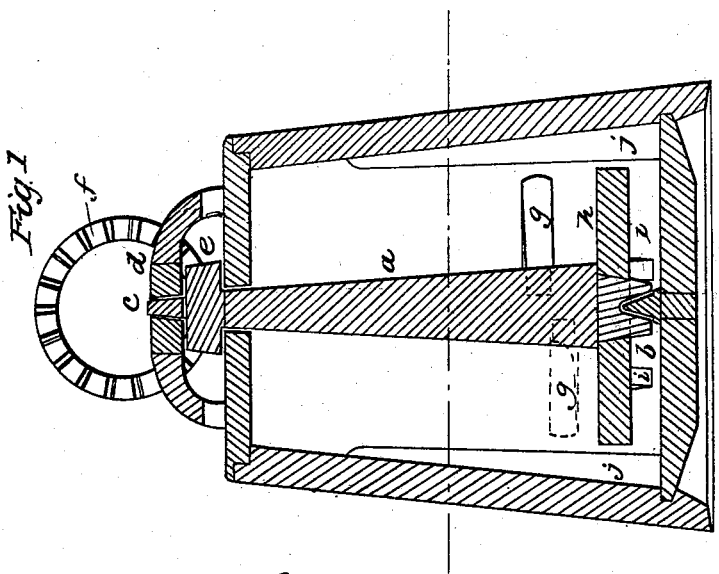
witnesses
T. Smith
L. Jones
Inventor
Jacob Dodder
by Atty Thos. T. Everett

UNITED STATES PATENT OFFICE.

JACOB DODDER, OF WASHINGTON, IOWA.

IMPROVEMENT IN CHURNS.

Specification forming part of Letters Patent No. 52,272, dated January 30, 1866.

*To all whom it may concern:*

Be it known that I, JACOB DODDER, of Washington, in the State of Iowa, have invented a certain new and useful Improvement on Churns; and I do hereby declare that the following is a full, clear, and exact description of the same, reference being had to the accompanying drawings, and to the letters and marks thereon, which said drawings form part of this specification, and by the figures thereof represent a churn having my improvement attached thereto, Figure 1 being a view by vertical section taken on the red line of Fig. 2, and Fig. 2 being a view by horizontal section taken in the red line of Fig. 1.

In each of these figures where like parts are shown like marks and letters are used to indicate the parts.

The object of my improvement is to force the cream contained in the churn and undergoing the process for producing butter down to the bottom part of the churn, and there to agitate and concentrate the butter, instead of allowing it to collect at the upper part of the churn, as is now more commonly the result in the churns used.

The means employed to effect this desirable object, and which are shown by the drawings, consist of a central shaft, $a$, having a bearing, $b$, in the bottom of the churn, and a bearing or support, $c$, in a bar or frame, $d$, on the lid or cover, with a beveled cogged wheel, $e$, affixed to the shaft thereof, that, by the action of another beveled cogged wheel, $b$, on another shaft, and having a crank-arm and handle, has rotation, carrying with it the shaft and the propelling-blades $g$ and the wheel $h$ connected thereto.

The body of the churn is vertical or upright, as is also the shaft $a$. The short shaft, which has on it the beveled wheel $b$, is, of course, at right angles, or thereabout, to the shaft $a$, this short shaft being in bearings at either end of a frame or bars which are a part of a common frame or support for this short shaft and the upper end of the shaft $a$. The short shaft, crank-arm, and handle, with the beveled wheels of the shafts are the means for giving rotation to the shaft $a$, instead of which other means substantially the same may be used.

Small studs project downward from the under surface of the wheel $h$, which are marked $i$, and strips or studs $j$ project inward from the interior surface of the churn. The studs $i$ will assist the wheel $h$ in agitating the cream and giving to it a centrifugal motion, while the strips $j$ will interrupt this motion, producing a reflux of the current and tend to direct it back under the wheel $h$.

The propelling-blades $g$ will force the cream and the butter through the openings or spaces $k$ in the wheel $h$, thus causing a downward current of the contents of the churn and enable the wheel and the other means named to concentrate and keep the butter at the bottom part of the churn.

The use of the churn constructed under my improvement has demonstrated that a larger quantity of butter will be more rapidly produced from a given quantity of cream than from most, if not from all, other churns now known.

What I claim as my invention, and desire to secure by Letters Patent as an improvement on churns, is—

The arrangement of the propelling-blades $g$ and wheel $h$ on a vertical shaft and within a vertical or upright churn, substantially as herein and for the purposes set forth, and, in combination with said blades and wheel, the studs $i$ and strips $j$, as described.

This specification signed this 21st day of November, 1865.

JACOB DODDER.

Witnesses:
L. F. SHERMAN,
H. M. HOLDEN.